INVENTORS
HAROLD GILMAN
BY THEODORE W. STEIN
GEORGE W. WHITTEN

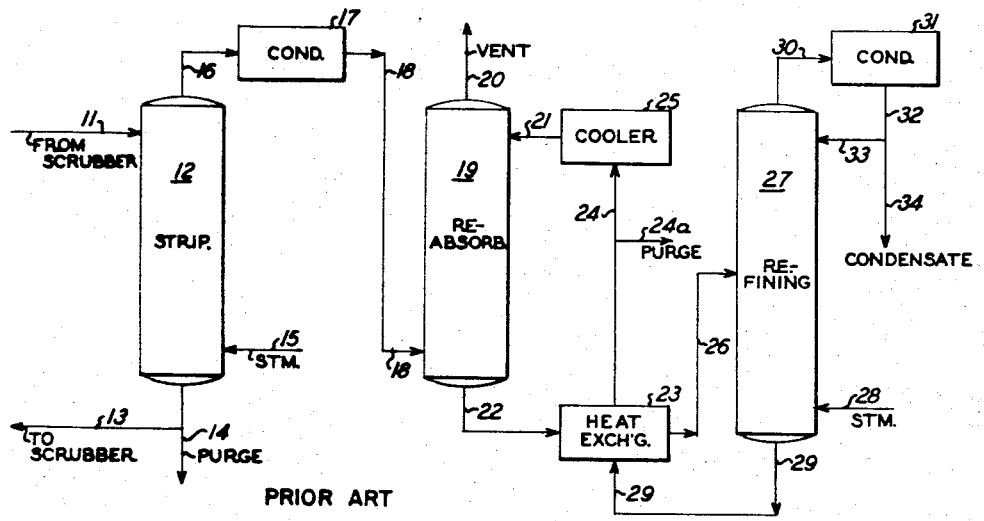
PRIOR ART
Fig.1
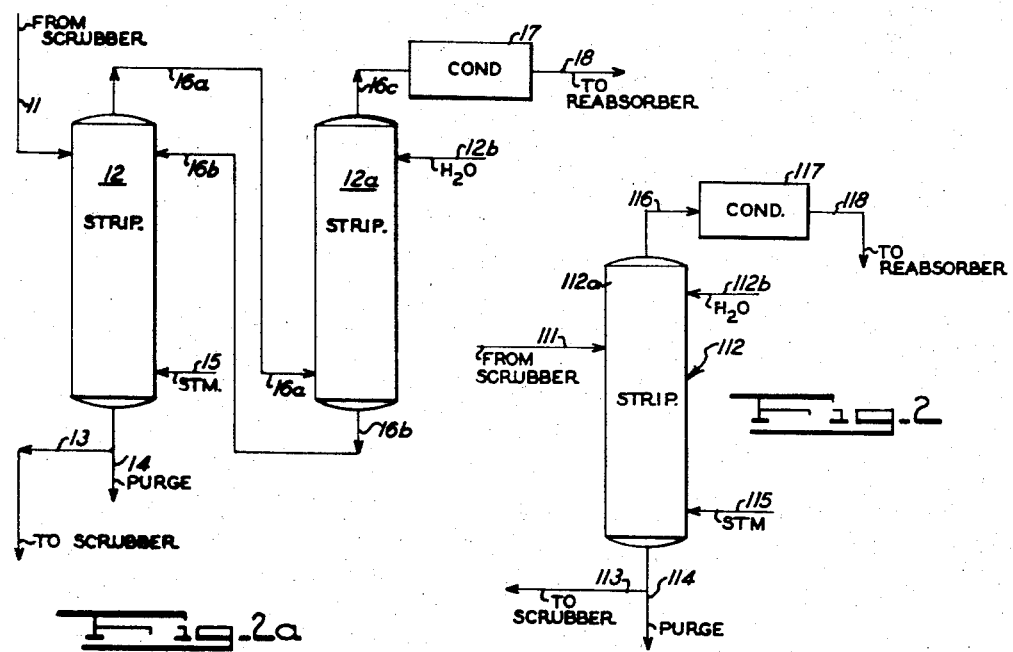
Fig.2a
Fig.2
INVENTORS
HAROLD GILMAN
THEODORE W. STEIN
GEORGE W. WHITTEN
BY William C. Long
ATTORNEY Dec. 24, 1968 H. GILMAN ET AL 3,418,338
WATER EXTRACTIVE DISTILLATION OF AN ETHYLENE OXIDE
STREAM CONTAINING FORMALDEHYDE
Filed Feb. 28, 1966 2 Sheets-Sheet 2

William C. Long
ATTORNEY

United States Patent Office 3,418,338
Patented Dec. 24, 1968

3,418,338
WATER EXTRACTIVE DISTILLATION OF AN ETHYLENE OXIDE STREAM CONTAINING FORMALDEHYDE
Harold Gilman, Jackson Heights, Theodore W. Stein, Hastings-on-Hudson, and George W. Whitten, Plandome Manor, N.Y., assignors to Halcon International, Inc., a corporation of Delaware
Filed Feb. 28, 1966, Ser. No. 530,635
6 Claims. (Cl. 260—348)

ABSTRACT OF THE DISCLOSURE

This invention relates to the production of ethylene oxide and particularly to the production of ethylene oxide of substantially improved purity. The inventive feature resides in enhancing the separation of formaldehyde contaminant from ethylene oxide by employing water as an extractive agent either in the usual stripping operation following aqueous absorption of ethylene oxide in the reactor effluent or in the use of water as extractive agent in the usual refining operation following reabsorption or secondary scrubbing of the overhead from said usual stripping operation.

---

This invention relates to the purification of ethylene oxide from an aqueous solution thereof, more particularly to obtaining a refined ethylene oxide which is substantially free of formaldehyde, and especially to such a process wherein the distillation separation of the formaldehyde from the ethylene oxide is carried out in the presence of a large excess of water whereby refined ethylene oxide is obtained as an overhead product and formaldehyde is removed as an aqueous bottoms fraction.

Ethylene oxide is a commercially important material and many processes are available for its manufacture. In the more modern processes, ethylene oxide is obtained by partial oxidation of ethylene in the vapor phase followed by scrubbing ethylene oxide from the gaseous reaction mixture by means of water. Ethylene oxide is then stripped from the aqueous scrubber solution and refined in known manner. For many purposes the resulting material is of sufficient purity. However, for other purposes it is further purified by stripping carbon dioxide and in addition small quantities of formaldehyde which may be present, and removing acetaldehyde and similar boiling material as a bottoms fraction or bleed. The resulting purified ethylene oxide is removed as a side steam. In such an operation, where it is desired to remove substantially all the formaldehyde, the latter is removed as an overhead bleed. This, however, has several disadvantages. If the formaldehyde concentration in the overhead bleed is high, a solid formaldehyde phase may form in the overhead system of the column thereby leading to blockage, erratic operation and possibly requiring shutdown and clean out. On the other hand, if the overhead bleed contains a low formaldehyde concentration, the relative amount of ethylene oxide therein is excessive and this results in yield loss of desired purified material. Accordingly, the art is confronted with the problem of providing a more efficient or economical process for producing purified ethylene oxide which is substantially free from formaldehyde.

It is an object of the invention to provide an improved method for purifying ethylene oxide.

It is a particular object to provide a method for producing ethylene oxide substantially free of formaldehyde.

Other objects will be apparent from the following description.

Figure 3:
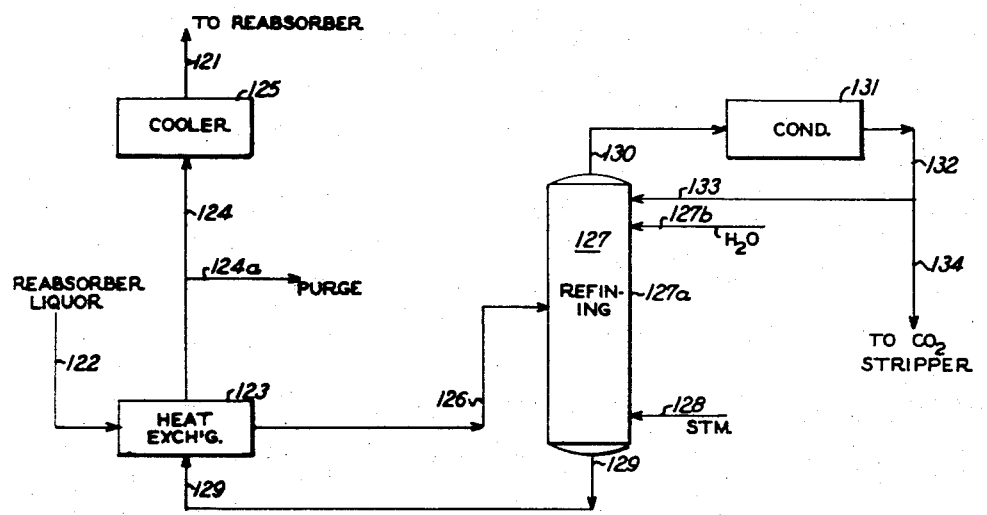
Figure 4:
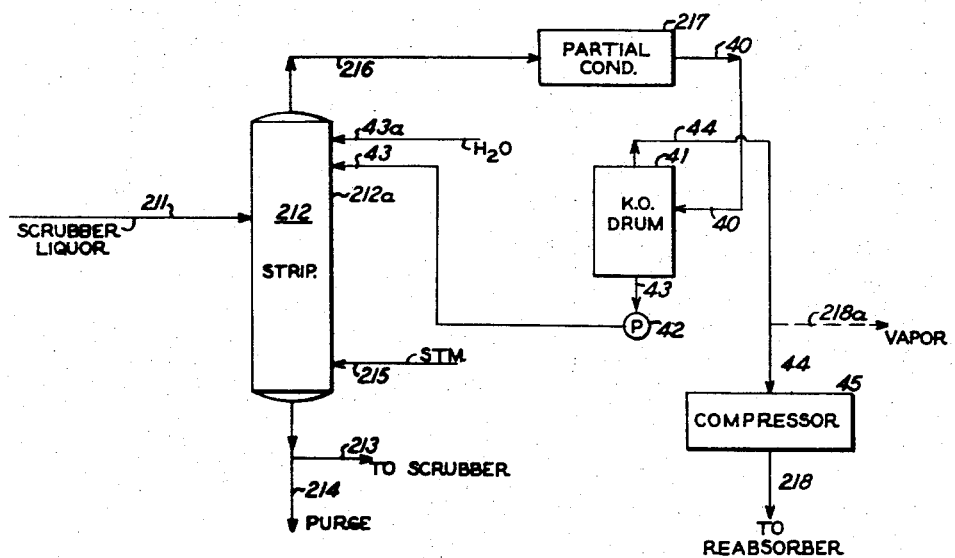

In the accompanying drawings, FIGURE 1 illustrates a refining system for producing refined ethylene oxide from aqueous scrubber liquor, the ethylene oxide containing as much as 50 p.p.m. (parts per million) of formaldehyde. FIGURES 2 through 4 show embodiments of the invention involving modifications of the FIGURE 1 system whereby the refined product ethylene oxide obtained by this invention contains only about 5 p.p.m. or less of formaldehyde.

Referring to FIGURE 1, aqueous scrubber liquor resulting from scrubbing an ethylene partial oxidation mixture and containing about 0.2 to 3.0 mol percent of ethylene oxide in water is passed via line 11 to stripper 12, wherein the liquor is stripped of most of its ethylene oxide, and the resulting lean aqueous liquor is passed via line 13 back to the scrubbing step. The lean liquor may contain about 0.005 mol percent or less of ethylene oxide. A small purge or bleed stream of liquor is removed via line 14. Stripping steam is introduced into stripper 12 by line 15. Stripped vapors pass via line 16 to condenser 17 wherein water and ethylene oxide are condensed and the resulting mixture is passed through line 18 to reabsorber 19. Noncondensed gases are removed via vent 20. Liquid containing about 2.0 to 6.0 mol percent ethylene oxide is passed from reabsorber 19 via line 22 to heat exchanger 23. After being heated in exchanger 23, the aqueous ethylene oxide stream is passed via line 26 to refining column 27. Steam is introduced into this column via line 28. Vapors from column 27 pass via line 30 to condenser 31 wherein they are condensed and then passed via lines 32 and 33 back to column 27 as reflux. A portion of the condensate is passed as product via line 34 to a carbon dioxide stripper of the usual type. The bottom fraction from column 27 is passed via line 29 through heat exchanger 23 wherein it is cooled and passed via line 24 to cooler 25 wherein it is further cooled and then via line 21 to reabsorber 19. A purge is removed via line 24a.

Illustrative conditions for the process in FIGURE 1 are given in U.S. Patent 3,174,262.

In the operation of the FIGURE 1 system, the refined product removed via line 34 may contain 50 p.p.m. of formaldehyde. Where this amount is too high for certain purposes, e.g. where the ethylene oxide can contain no more than 10 p.p.m. of formaldehyde, the formaldehyde content must be lowered by further purification, e.g., by methods which have many disadvantages as has already been discussed. To overcome these disadvantages and produce a refined ethylene oxide containing substantially no formaldehyde, e.g., 5 p.p.m. or less, the FIGURE 1 system is modified in accordance with the invention as set forth in FIGURES 2 through 4.

Referring to FIGURE 2, the stripper is modified in accordance with the invention to include an extractive distillation system using water as the extractive fluid. In describing the system, the numbers used are analogous to those of FIGURE 1 except that each is preceded by a "1." The rich aqueous liquor from the scrubber containing 0.2 to 3 mol percent ethylene oxide is passed via line 111 into stripper 112, wherein it is stripped, and the resulting lean liquor is passed via line 113 back to the scrubber system. The stripper includes the upper section 112a equivalent to at least one theoretical tray. The extracting water in amount of 1.5 to 6.0 moles per mol washed vapor is introduced (preferably at a temperature equal to the dew-point of the vapor) to the upper section via line 112b and steam is introduced in the lower section via line 115. A small purge of lean liquor is removed via line 114. Vapors are passed from the stripper via line 116 to condenser 117 wherein ethylene oxide and water are condensed and the resulting mixture is passed via line 118 to the reabsorber. The stripper may be operated at a pressure of 50 to 80 p.s.i.a. Formaldehyde is removed by this system, e.g., with the purge in line 114.

Referring to FIGURE 2a, the identifying numbers are the same as in FIGURE 1. However, instead of the section 112a of FIGURE 2, a separate vessel 12a is used. The water in amount of 1.5 to 6.0 mols per mol overhead vapor is introduced via line 12b and vapors are introduced via line 16a. Vapors are passed therefrom via line 16c to condenser 17 and via line 18 to the reabsorber and subsequent system, as set forth in FIGURE 1. Bottoms from the extractive distillation vessel 12a are passed via line 16b to stripper 12. This alternative gives similar improvements to those obtained with the FIGURE 2 system.

Referring to FIGURE 3, the refining column of FIGURE 1 is modified, and using a numbering system analagous to that discussed for FIGURE 2, rich reabsorber liquor usually containing 2 to 6 mol percent ethylene oxide is passed via line 122 to heat exchanger 123 and then via line 126 to refining column 127. Water in amount of 1.2 to 20 mols per mol overhead vapor is introduced via line 127b preferably at a temperature substantially equal to the dew-point of the vapor which it contacts. This column is provided with an intermediate section 127a equivalent to at least one theoretical tray. Steam is introduced via line 128 and the bottoms liquor is passed via line 129 through heat exchanger 123 wherein it is cooled and then via line 124 to cooler 125 wherein it is further cooled, and then processed as described for FIGURE 1. A purge of this liquor containing essentially all of the formaldehyde in the net feed to the reabsorber is removed via line 124a. The overhead from column 127 is passed via line 130 to condenser 131 wherein it is condensed. A portion of the condensate is passed via lines 132 and 133 back to the upper part of the column 127; a portion of the condensate which contains about 2 p.p.m. of formaldehyde is passed to the carbon dioxide stripper.

The refining column may operate at a pressure of about 15 to 100 p.s.i.a.

In the FIGURE 4 modification, the stripper system of FIGURE 2 is used, except at the lower pressures. For this there is included a knockout drum and a pump and a compressor arrangement. As to identical items, analogous numbers to those of FIGURE 1 are used except that each is preceded by "2," and as to the added items they are identified by numbers 40 through 45. Scrubber liquor is passed via line 211 to stripper 212 and steam is introduced via line 215. Lean liquor is passed via line 213 back to the scrubber system and a small purge of lean liquor containing formaldehyde is removed via line 214. Overhead vapors pass from stripper 212 via line 216 to partial condenser 217 where water containing a small quantity of ethylene oxide is condensed and the mixture is passed via line 40 to knockout drum 41 wherein condensate separates as a liquid phase. The condensate is passed via line 43 and pump 42 back to the upper part of stripper 212. An additional quantity of water may be introduced via line 43a. Vapor is passed from the knockout drum 41 via line 44 to compressor 45 where it is compressed and then passed via line 218 to the reabsorber and subsequent system of FIGURE 1, or directly to the refining column.

The stripper is operated at a pressure of about 5 p.s.i.a. The vapor is compressed in compressor 45 to a pressure of about 16 p.s.i.a. or higher. The stripper includes an extractive distillation section 212a above the fat liquor feed 211 and below the aqueous liquor return 43. This system gives a reduction in the formaldehyde content in the refined product comparable to that of the FIGURE 2 system.

In an alternate using the FIGURE 4 system, the pressure is about 20 p.s.i.a. and no compressor is required. The vapor is passed via line 218a to a reabsorber.

In order to indicate still more fully the nature of the present invention, the following examples of typical procedures are set forth in which parts and percents mean parts and percents by weights, respectively, unless otherwise indicated, it being understood that these examples are presented as illustrative only and they are not intended to limit the scope of the invention.

EXAMPLE 1

Rich aqueous ethylene oxide liquor which is obtained by the method of U.S. Patent 2,693,474, is passed in amount of 1,000 lbs. per hour via line 111 of FIGURE 2 into stripper 112. The liquor contains about 0.5 mol percent of ethylene oxide and about 24 p.p.m. formaldehyde. The stripper is operated at a pressure of 20 p.s.i.a. and are overhead temperature of about 103° C. Steam is introduced via line 115. About 1.3 mols of extracting water at about 103° C. is introduced via line 112b per mol of vapor overhead. A purge in amount of 92.7 pounds per hour containing 215 p.p.m. formaldehyde is removed via line 114, and may be discarded. Alternatively, it may be processed for converting the small amount of ethylene oxide therein to ethylene glycol and recovering it, in known manner. About 983 pounds per hour of lean liquor are passed via line 113 to the scrubber. About 28 pounds per hour of vapors containing 15 p.p.m. formaldehyde are removed from the stripper via line 116.

Continuing the operation in accordance with the system set forth in FIGURE 1, the reabsorber liquor contains about 4 mol percent of ethylene oxide and it is processed refining column 27 at a pressure of 15 to 100 p.s.i.a. Steam is introduced via line 28. The bottoms from column 27 is substantially free of ethylene oxide and after heat exchanging and cooling it is passed to column 19 via line 21.

The product is passed via line 34 to a usual carbon dioxide stripping and final purification system. This product contains only about 3 p.p.m. of formaldehyde.

EXAMPLE 2

The procedure of Example 1 is repeated except using the system of FIGURE 2a under similar operating conditions, and similar results are obtained.

EXAMPLE 3

In this example, the initial operation is as set forth for FIGURE 1, but the refining system is that of FIGURE 3. The scrubber liquor introduced via line 11 in amount of 1,000 pounds per hour contains about 0.5 mol percent ethylene oxide and 24 p.p.m. formaldehyde and it is stripped in stripper 12 at a pressure of 20 p.s.i.a. and 217° F. overhead temperature. The purge in amount of 19.7 pounds per hour taken off via line 14 contains about 0.005 mol percent of ethylene oxide, or less and 45 p.p.m. formaldehyde and it may be discarded or processed in known manner to recover contained ethylene glycol and to produce and recover ethylene glycol from the ethylene oxide therein. Lean liquor in amount of 983 pounds per hour is passed via line 13 to the scrubber.

Vapors from the stripper in amount of 28.1 pounds per hour containing 165 p.p.m. formaldehyde are condensed and reabsorbed.

The liquor from reabsorber 19 in amount of 132 pounds per hour and containing 35 p.pm. formaldehyde is passed through heat exchanger 123 and line 126 into refining column 127. This liquor contains about 4 mol percent of ethylene oxide. The refining column is operated at a pressure of 16 to 20 p.s.i.a. About 10 pounds of water per hour is fed via line 127b, at about 18° to 60° C.

The bottoms liquor which is passed via line 129 to heat exchanger 123 and line 124 back to cooler 125 is essentially free of ethylene oxide. A purge thereof in amount of 26 pounds per hour is taken off via line 124a. This purge contains the removed formaldehyde. The purge may be discarded, or processed as already described to recover ethylene glycol.

Overhead ethylene oxide product 12.2 pounds per hour and containing 4 p.p.m. formaldehyde is removed via line 134.

EXAMPLE 4

In this example the system of FIGURE 4 is used, and 1,000 pounds per hour of aqueous scrubber liquor containing 0.5 mol percent of ethylene oxide and 24 p.p.m. formaldehyde is introduced via line 211 into scrubber 212 and steam is introduced via line 215. Stripper liquor in amount of 983 pounds per hour is passed via line 213 back to the scrubber system and a purge containing the removed formaldehyde is removed via line 214. The stripper operates at a reduced pressure of about 5 p.s.i.a. and 161° F. overhead. Overhead vapor is passed to partial condenser 217 and is partially condensed at 113° F. and the mixture is passed to knockout drum 41 wherein liquid is separated. The vapor therefrom in amount of 13.3 pounds per hour and containing 73.5% ethylene oxide on an inerts free basis after compressing in compressor 45 to 16 p.s.i.a., is passed to the reabsorber 19 in FIGURE 1. The liquor from the knockout drum in amount of 13.7 pounds per hour is passed via line 43 and pump 42 to the upper part of stripper 212, i.e., it is fed above the extractive distillation section 212a. Additional water at 161° F. in an amount of 1.2 mols per mole of overhead vapor introduced via line 43a.

The vapor from line 218 is passed to the reabsorber 19 of FIGURE 1 and then processed as described in Example 1 to give a final refined product comparable to that of Example 1.

In an alternate, the stripper pressure is 20 p.s.i.a., and the vapor is passed via line 218a to a reabsorber, and similar results are obtained.

The marked reduction of formaldehyde content obtained in accordance with the invention as set forth in these examples is indeed surprising inasmuch as it overcomes the above described disadvantages of prior suggestions. These improvements are achieved by relatively small capital investments as well as relatively small process cost requirements. Also, there is substantially no loss of ethylene oxide.

Comparable results to the foregoing may be achieved by various modifications thereof, including the following. Any system which includes a process step of separating the formaldehyde admixed with water as a bottoms fraction and removing the ethylene oxide as an aqueous overhead product may be employed in accordance with the invention, the product being dried in usual manner. In such a system employing a large excess of water, the volatility of ethylene oxide is much higher than that of the formaldehyde mixture. The ethylene oxide content of liquor used may be from 0.2 to 6.0 mol percent, stripper and refining system pressures used may be in the range of atmospheric up to about 100 p.s.i.a., or down to 5 p.s.i.a. or less when the system is provided with a compressor between the stripper and the reabsorber, preferably just before the absorber. In the extractive distillation step or section of the process, an amount of water in the range of 1.2 to 20 mols per mol of overhead vapor is added, the amount being selected so as to reduce the formaldehyde content of the product to the desired low level. The formaldehyde content of the final ethylene oxide product is not over 10 p.p.m., desirably not over 5 p.p.m. and preferably not over 2 p.p.m.

In view of the foregoing disclosures, variations and modifications thereof will be apparent to one skilled in the art, and it is intended to include within the invention all such variations and modifications except as do not come within the scope of the appended claims.

What is claimed is:

1. In a process for the separation of ethylene oxide from an aqueous solution of ethylene oxide and formaldehyde comprising subjecting said solution to distillation to obtain ethylene oxide contaminated by formaldehyde as an overhead vapor, the improvement for reducing the degree of said contamination comprising adding water as sole extractive agent to said distillation, extractively distilling said aqueous solution removing a bottoms stream and purging the bottoms stream removed from said distillation to remove formaldehyde from the system.

2. In a process for the production of ethylene oxide comprising partially oxidizing ethylene in the vapor phase to produce a gaseous ethylene oxide-formaldehyde-containing reaction mixture, scrubbing said reaction mixture with water to obtain an aqueous solution of ethylene oxide and formaldehyde, and subjecting said solution to distillation to obtain ethylene oxide contaminated by formaldehyde as an overhead vapor, the improvement for reducing the degree of said contamination comprising adding water as sole extractive agent to said distillation, extractively distilling said aqueous solution, removing a bottoms stream and purging the bottoms stream removed from said distillation to remove formaldehyde from the system.

3. A process according to claim 2 comprising carrying out said distillation with a column having at least one theoretical tray between the aqueous solution feed inlet and the extractive agent inlet, the latter being above the former.

4. A process according to claim 3 comprising partially condensing said overhead vapor and feeding resultant condensate to the upper portion of said column as reflux.

5. A process according to claim 3 comprising carrying out said extractive distillation with two stripping columns, feeding said solution to the upper portion of the first stripping column and said extractive agent to the upper portion of the second stripping column, feeding the overhead vapor from said first stripping column to the lower portion of said second stripping column, and feeding the liquid bottoms from said second stripping column to the upper portion of said first stripping column.

6. In a process for the production of ethylene oxide comprising partially oxidizing ethylene in the vapor phase to produce a gaseous ethylene oxide-formaldehyde-containing reaction mixture, scrubbing said reaction mixture with water to obtain an aqueous solution of ethylene and formaldehyde subjecting said solution to a stripping operation to obtain ethylene oxide contaminated by formaldehyde as an overhead vapor, condensing ethylene oxide in said overhead vapor to form a stream of condensate and noncondensed gases, subjecting said stream to a second scrubbing operation wherein an aqueous bottoms solution of ethylene oxide is formed and overhead noncondensed gases are vented, subjecting said bottoms solution to a refining operation to produce an ethylene oxide overhead contaminated with formaldehyde and a substantially water bottoms, recycling said water bottoms to said second scrubbing operation as absorption medium, condensing the refined overhead, returning a portion of the refined condensate to said refining operation as reflux and collecting the balance of the refined condensate as crude ethylene oxide product contaminated with formaldehyde, the improvement for reducing the degree of contamination of said product comprising adding water as sole extractive agent to said refining operation, extractively distilling the feed thereto, removing a bottoms stream from said refining operation, and purging the removed bottoms stream therefrom to remove formaldehyde from the system.

References Cited

UNITED STATES PATENTS

| 2,615,901 | 10/1952 | McClellan | 260—348 |
| 2,622,060 | 12/1952 | Robeson et al. | 203—83 |
| 2,775,510 | 12/1956 | Gardner et al. | 260—348 |
| 3,165,539 | 1/1965 | Lutz | 203—42 |
| 3,174,262 | 3/1965 | Lutz | 55—48 |
| 3,213,113 | 10/1965 | Randall et al. | 260—348 |

WILBUR L. BASCOMB, Jr. *Primary Examiner.*

U.S. Cl. X.R.

203—4, 75, 76, 77, 82, 83, 87, 93, 97, 42; 260—348.5; 55—48